United States Patent [19]

Osselet et al.

[11]  4,235,810

[45]  Nov. 25, 1980

[54] ALKYLATES AND SULPHONIC ACIDS AND SULPHONATES PRODUCED THEREFROM

[75] Inventors: André Osselet; Robert Tirtiaux, both of Mont-Saint-Aignan, France

[73] Assignee: Exxon Research & Engineering Co., Florham Park, N.J.

[21] Appl. No.: 930,808

[22] Filed: Aug. 3, 1978

Related U.S. Application Data

[63] Continuation-in-part of Ser. No. 873,631, Jan. 30, 1978, abandoned.

[51] Int. Cl.$^3$ ...................... C07C 143/24; C10M 1/40
[52] U.S. Cl. ............................ 260/505 A; 260/505 S; 252/33

[58] Field of Search ......................... 260/505 A, 505 S

[56]  References Cited

U.S. PATENT DOCUMENTS 2,712,530  7/1955  Baumgartner ................... 260/505 A
2,806,875  9/1957  Geiser .............................. 260/505 A Primary Examiner—A. Siegel
Attorney, Agent, or Firm—Frank T. Johmann

[57]  ABSTRACT

Alkyl aromatics are prepared by alkylation with a mixture of straight and branched chain olefines. The alkylates may be sulphonated to yield low viscosity sulphonate emulsifiers and are raw materials for producing low foaming overbased sulphonate lubricant additives.

8 Claims, 1 Drawing Figure

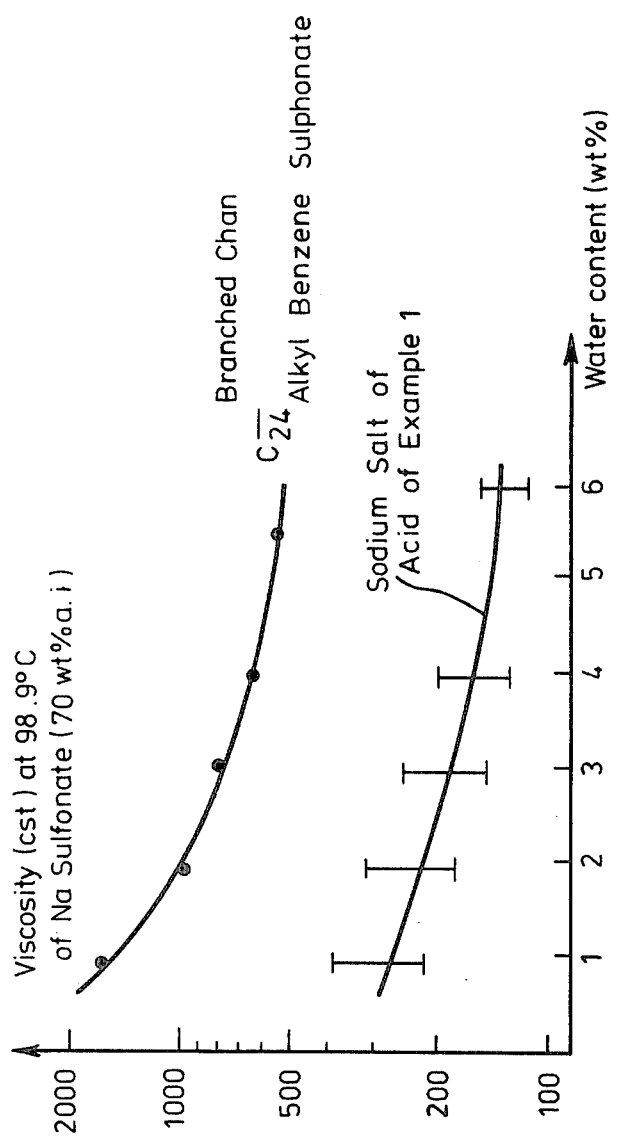

ALKYLATES AND SULPHONIC ACIDS AND SULPHONATES PRODUCED THEREFROM

RELATED APPLICATIONS

This application is a continuation-in-part of our Ser. No. 873,631 filed Jan. 30, 1978 and now abandoned.

The present invention relates to improved alkyl aromatic compounds, known as alkylates, and their preparation, and to oil soluble sulphonic acids and sulphonates produced from the alkylates. In particular the invention is concerned with alkylates from which overbased sulphonates especially overbased calcium sulphonates which have a reduced tendency to cause foaming when they are used as lubricant additives may be obtained.

Sulphonates, particularly calcium, barium or magnesium overbased sulphonates are widely used as additives for lubricating oils. The term overbased is used to describe sulphonates containing an amount of metal in excess of that required to react with the sulphonic acid from which the sulphonate is obtained. Frequently the excess metal is in the form of its carbonate in which case the overbased sulphonate consists of a colloidal dispersion of the metal carbonate in the metal sulphonate as dispersant. These overbased sulphonates are used as dispersants in the lubricating oil where their high basicity neutralises acids which develop in crank cases during engine operation thus reducing corrosin.

Sulphonic acids and sulphonates are generally obtained from mono-alkylates of aromatics the alkyl chain being either branched or straight chain. Oil soluble sulphonic acids are obtained from alkylates containing an alkyl group of more than 16 generally more than 20, carbon atoms, which group is usually branched chain since branched chain olefines are more readily available and cheaper than the corresponding straight chain olefines.

However, one problem associated with the use of overbased sulphonates, particularly overbased sulphonates obtained from branched chain alkylates, is that despite the inclusion of an antifoam agent in the oil, after a short period of use they tend to cause foaming of the lubricant during operation of the engine which is, of course, undesirable. This problem is particularly marked with overbased calcium sulphonates. It has been proposed in British Patent Specification 1391821 to overcome this problem by preparing the sulphonic acids from mixtures of straight and branched chain alkylates. Whilst this technique has proved successful it requires significant amounts of the straight chain alkylate which increases costs since the straight chain olefines from which these alkylates are made are more expensive than the branched chain olefins that we used. We have found that the same effect may be achieved using considerably less of the straight chain olefine if the alkylates from which the sulphonic acids are produced are obtained by alkylating an aromatic compound with a mixture of branched and straight chain olefines.

The present invention therefore provides a process for the production of alkylates comprising alkylating an aromatic compound with a mixture containing up to 95% by weight of a branched chain olefin containing from 15 to 40 carbon atoms and at least 5% by weight of a linear olefin containing from 16 to 30 carbon atoms the molar ratio of said aromatic compound to the olefin mixture being from 10:1 to 1:1.

The alkylation reaction may be achieved by any of the well-known alkylation techniques. Our preferred technique being the use of a Friedel Crafts catalyst such as aluminium trichloride preferably together with hydrochloric acid. No special conditions are needed for alkylation, our invention being the composition of the olefine feed and the ratios of the material used. In the aspect of the invention concerned with alkylates for producing overbased sulphonates our techniques are particularly useful when the aromatic compound is benzene since the problems of foaming of lubricants containing the overbased alkyl benzene sulphonates are particularly acute.

We find that the olefine mixture used as the feed should contain at least 5 wt.% of the linear olefine since mixtures containing less than 5 wt.% do not give the improved sulphonic acids and sulphonates. We have also found that there is no further improvement in effect if the mixture contains more than 30 wt.% of the linear olefine. Thus, since linear olefines are more expensive than branched chain olefines we prefer that the mixture contain from 5% to 30% by weight of the linear olefine although this is not essential. We have found that there is little if any reduction of the foaming tendency of the lubricant if the linear olefine from which the sulphonate is derived contains fewer than 16 carbon atoms and we prefer to use olefins containing less than 24 carbon atoms since heavier olefins tend to be unsuitable because they are waxy.

The branched chain olefine should contain from 15 to 40 carbon atoms to ensure the desired oil solubility and viscosity of the sulphonates obtained from the alkylates. Because of their ready availability we prefer to use oligomers of propylene as our branched chain olefines.

The ratio of aromatic compound to the olefine mixture in the reaction of our invention should be from 10:1 to 1:1 by volume so that an excess of the olefine is not used. This ensures that the products formed are essentially mono-alkyl aromatics which we find to be important since dialkyl aromatics containing a branched chain alkyl group are difficult to sulphonate.

The alkylates of our invention may be used themselves, for example as synthetic lubricants. The principle use with which we are concerned however is as raw materials in the production of alkylaryl sulphonic acids, particularly sulphonic acids that are subsequently converted to overbased sulphonates especially calcium sulphonates or to neutral sulphonates such as sodium sulphonates which are used as emulsifiers.

As a further aspect the present invention therefore provides a process for the production of sulphonic acids comprising sulphonating an alkyl aromatic compound that has been obtained by alkylating an aromatic compound with a mixture containing up to 95% by weight of a branched chain olefine containing from 15 to 40 carbon atoms and at least 5% by weight of a linear olefine containing from 16 to 30 carbon atoms the mole ratio of said aromatic compound to the olefine mixture being from 10:1 to 1:1.

Any of the well known sulphonation techniques can be used. For example the alkylate may be sulphonated with concentrated sulphuric acid, with oleum or with sulphur trioxide dissolved in sulphur dioxide, this latter technique being preferred. After sulphonation the sulphonic acid is purified by standard techniques or purifying aids such as the addition of olefines and optionally water as described in our copending application U.K. Ser. No. 6775/76 and its U.S. counterpart Pat. No. 4,153,627 and the ether containing compounds as described in our application U.K. Ser. No. 5100/75 now U.K. Pat. No. 1,469,203 corresponding to U.S. Ser. No. 557,396 may be included.

The sulphonic acids produced according to this further aspect of our invention may be neutralised to form sulphonates which may be used as detergents, dispersants and emulsifiers. The choice of cation will depend upon the use to which the sulphonate is to be put. For use as an emulsifier or in oil recovery the cation will generally be an alkali metal or a quaternary nitrogenous cation, whilst for use as lubricant additives the cation will usually be calcium, barium or magnesium and the sulphonate is often overbased.

The present invention therefore further provides a sulphonate in which the anion is derived from a sulphonic acid obtained by sulphonating an alkyl aromatic compound that has been obtained by alkylating from 1 to 10 moles of an aromatic compound with one mole of a mixture containing up to 95% by weight of a branched chain olefin containing from 15 to 40 carbon atoms and at least 5% by weight of a linear olefine containing from 16 to 30 carbon atoms and the cation is an alkali metal, a quaternary nitrogenous group or calcium, magnesium or barium.

We have found that overbased sulphonates according to this further feature of our invention have reduced foaming tendency and neutral sulphonates which may be used as emulsifiers have improved stability and these improvements are achieved with most aromatic compounds. Since the greatest foaming problems occur with alkyl benzenes our technique is particularly useful with benzene, although an improvement is also achieved with toluene and xylene. We find in particular that neutral sulphonates of this invention particularly alkali metal or nitrogenous base salts may be used as the higher molecular sulphonate of the emulsifier compositions of our copending application U.K. Ser. No. 8740/75 and that resulting oil in water emulsions have especially good emulsion stability and are most useful as metal working fluids.

Where the cation of the sulphonate of the present invention is an alkali metal it is generally sodium, where it is a quaternary nitrogenous group it may be an ammonium cation although we find quaternary amino, particularly ethoxylated quaternary amino sulphonates to be especially useful surfactants. The principle benefits of the use of the mixed olefine feedstock is in the production of overbased alkaline earth metal sulphonates which are used as lubricant additives. In particular the invention is useful in producing overbased calcium sulphonates which when used as lubricant additives have a reduced tendency to cause foaming of an automobile crankcase lubricant during operation of the motor. We have found that using overbased calcium sulphonates based on our alkylates, acceptable foam levels may be obtained using the conventional antifoam additives which is not the situation with overbased additives based on other alkylates and that furthermore in some instances the antifoam additives may not be needed.

The calcium sulphonate may be a neutral sulphonate or an overbased sulphonate although, since it is the overbased sulphonates that pose the greatest foaming problems, it is here our techniques have the greatest use. These materials are generally produced by the neutralisation of the sulphonic acid with lime in the presence of reaction promoters and then carbonating the reaction mixture to convert the excess calcium present to colloidal calcium carbonate. Various techniques have been proposed for controlling the viscosity and speed of reaction and the alkylates of our invention may be used in the production of sulphonic acids by any of these techniques. Although primarily directed at overcoming the foaming problems of overbased calcium sulphonates the alkylates may also be used in the preparation of neutral and overbased magnesium and barium sulphonates.

The calcium, magnesium and barium sulphonates are useful as additives for lubricating oil where they may be used in the amounts traditionally used and in combination with other well-known additives such as the polyamine dispersants, viscosity index modifiers and antiwear additives. We have found that the use of sulphonates derived from the alkylates of this invention yields lubricating oils with reduced foaming tendency as compared with oils containing currently available sulphonates and also that less straight chain component is required to achieve this than with oils containing sulphonates based on a mixture of alkyl benzenes some carrying branched chain alkyl group and others carrying linear alkyl groups, the two types of alkylate having been prepared separately.

The present invention is illustrated, but in no way limited, by the following Examples.

EXAMPLE 1

85 wt.% of a $C_{24}$ average branched chain propylene oligomer was blended with 15 wt.% of $C_{24}$ linear olefine. 839 parts by weight of this olefine mixture were added to 1360 parts by weight of benzene in an alkylation vessel at 0° C. containing 17 parts by weight of aluminium trichloride and 4 parts by weight of hydrochloric acid. The vessel was held at that temperature for half an hour, the temperature then raised to 20° C. for 3 hours while the alkylate settled and the alkylate finally washed with sodium hydroxide and water and purified by distillation.

The alkylate thus obtained had a specific gravity at 15° C. of 0.860 (as measured by ASTM D 1298), a flash point of 185° (as measured by ASTM D 92), a viscosity at 100° F. of 75 centistokes (as measured by ASTM D 445) and a molecular weight of about 420.

The alkylate was sulphonated with sulphur trioxide dissolved in sulphur dioxide and the resulting sulphonic acid separated, purified and converted into 300 TBN overbased calcium sulphonate by the process described in French Pat. No. 1526400.

EXAMPLE 2

The process of Example 1 was repeated except that the starting olefine mixture contained 80 wt.% of the branched chain olefine and 20 wt.% of the linear olefine.

EXAMPLE 3

For the sake of comparison benzene was separately alkylated with the linear olefine and the branched chain olefine used in Example 1 using exactly the same alkylation conditions as used in Example 1.

The blends of the alkylates so obtained were prepared containing 85 wt.% of the branched chain alkylate and 15 wt.% of the linear chain alkylate and the other containing 80 wt.% of the branched chain alkylate and 20 wt.% of the linear chain alkylate.

Both these blends were sulphonated and converted into a 300 TBN overbased calcium sulphonates by the techniques described in Example 1.

EXAMPLE 4

5 wt.% of the 300 TBN Calcium high base number sulphonates of Examples 1 to 3 were incorporated into a standard reference oil (SIS 3453) and the oils subjected to the standard ASTM D 892 foam test. The materials were also compared with the same oil containing 5 wt.% of the 300 TBN calcium sulphonate obtained from $C_{24}$ branched chain alkyl benzene. The lubricants tested also contained 400 parts per million of the calcium high base number sulphonate of the silicone antifoam agent commercially available as Monsanto DC 200.

The results of the tests were as follows:

| Sulphonates Derived From | Test Result |
|---|---|
| Example 1 | 40/0 |
| Example 2 | T/0 |
| Example 3 (i) | 240/0 |
| (ii) | 20/0 |
| $C_{24}$ Alkyl Benzene | 650/500 |

T indicates that only a trace of foam was formed

EXAMPLE 5

The foaming properties of a lubricant containing the product of Example 1 were also compared with those of a lubricant containing the calcium sulphonate obtained from the $C_{24}$ branched chain alkyl benzene. In this instance the lubricants contained no antifoam agent. The results were as follows:

| Product of Example 1 | 410/320 |
|---|---|
| $C_{24}$ Alkyl Benzene | 650/500 |

EXAMPLE 6

The sodium salt of the sulphonic acid of Example 1 was prepared by neutralisation with sodium hydroxide and the viscosity of a 70 wt.% active ingredient solution of the sodium sulphonate in a diluent oil was measured at 98.9° C. The viscosity of solutions containing increasing amounts of water was determined and compared with similar solutions containing a branched chain $C_{24}$ alkyl benzene sulphonate.

The results of these tests are set out in the graph which is attached hereto as FIG. 1.

What we claim is:

1. An overbased alkaline earth metal sulfonate lubricant additive of a sulfonic acid prepared by sulfonating an aromatic alkylated with a mixture consisting essentially of about 5 to 30 wt. % linear olefin containing 16 to 30 carbon atoms and up to about 95% of branched chain olefin containing from 15 to 40 carbon atoms, the molar ratio of said aromatic compound to the olefin mixture being from 10:1 to 1:1.

2. An overbased sulfonate according to claim 1, in which said alkaline earth metal is calcium.

3. An overbased sulfonate according to claim 2, in which said branched chain olefin is an oligomer of propylene.

4. An overbased sulfonate according to claim 3, wherein the linear olefin contains an average of about 24 carbon atoms.

5. An overbased sulfonate according to claim 2, wherein said branched chain olefin is propylene oligomer having an average of about 24 carbons, and said linear olefin is a $C_{24}$ olefin.

6. An overbased sulfonate according to claim 5, wherein said aromatic is benzene.

7. An overbased calcium sulfonate lubricant additive of sulfonic acid prepared by sulfonating an aromatic alkylated with a mixture of about 85 wt. % of $C_{24}$ propylene oligomer and about 15 wt. % of $C_{24}$ linear olefin, and wherein the molar ratio of said aromatic compound to said olefin mixture is from 10:1 to 1:1.

8. An overbased calcium sulfonate lubricant additive of alkylaryl sulfonic acid prepared by sulfonating an aromatic alkylated with a mixture consisting essentially of about 80 wt. % of $C_{24}$ propylene oligomer and about 20 wt. % of linear $C_{24}$ olefin, and wherein the molar ratio of said aromatic compound to said olefin mixture is from 10:1 to 1:1.

* * * * *